US010455035B2

(12) United States Patent
Murdock et al.

(10) Patent No.: US 10,455,035 B2
(45) Date of Patent: Oct. 22, 2019

(54) LOCATION-BASED MOBILE STORYTELLING USING BEACONS

(71) Applicant: Disney Enterprises, Inc., Burbank, CA (US)

(72) Inventors: Malcolm Murdock, Los Angeles, CA (US); Kimberly Porter, Altadena, CA (US); Richard Ginter, Valencia, CA (US); Mohammad Poswal, Santa Clarita, CA (US); Michele Wells, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/375,151

(22) Filed: Apr. 4, 2019

(65) Prior Publication Data

US 2019/0230173 A1 Jul. 25, 2019

Related U.S. Application Data

(63) Continuation of application No. 14/509,314, filed on Oct. 8, 2014, now Pat. No. 10,320,924.

(51) Int. Cl.
| | |
|---|---|
| *G06F 3/00* | (2006.01) |
| *H04L 29/08* | (2006.01) |
| *H04W 4/021* | (2018.01) |
| *H04W 4/30* | (2018.01) |
| *G06F 3/0482* | (2013.01) |
| *G06F 3/01* | (2006.01) |

(52) U.S. Cl.
CPC ............ *H04L 67/22* (2013.01); *G06F 3/0482* (2013.01); *H04W 4/021* (2013.01); *H04W 4/30* (2018.02)

(58) Field of Classification Search
CPC ......... G06F 3/0482; H04L 67/22; H04W 4/04
See application file for complete search history.

(56) References Cited

U.S. PATENT DOCUMENTS

| 6,079,982 A * | 6/2000 | Meader .................... A63F 13/08 434/29 |
| 6,179,619 B1 * | 1/2001 | Tanaka ...................... A63G 7/00 434/307 R |
| 7,788,323 B2 * | 8/2010 | Greenstein .............. G06T 19/00 709/204 |
| 7,804,507 B2 * | 9/2010 | Yang ........................ A63F 13/02 345/633 |
| 7,817,150 B2 * | 10/2010 | Reichard ................. G06T 19/00 345/419 |

(Continued)

*Primary Examiner* — Nicholas Augustine
(74) *Attorney, Agent, or Firm* — Farjami & Farjami LLP

(57) ABSTRACT

There is provided a system and method for location-based mobile storytelling using beacons. The system including a memory storing a storytelling software application, the storytelling software application configured to generate a story that includes a plurality of segments, each segment of the plurality of segments of the story being associated with one of a plurality of beacons, and a processor configured to execute the storytelling software application to receive a first message transmitted from a first beacon of the plurality of beacons, determine a first beacon identity of the first beacon using the first message, generate a first segment of the plurality of segments of the story based on the first beacon identity, the first segment of the story being associated with the first beacon, and play the first segment of the story.

20 Claims, 3 Drawing Sheets

(56) References Cited

U.S. PATENT DOCUMENTS

| | | | | |
|---|---|---|---|---|
| 2004/0113887 | A1* | 6/2004 | Pair | G09B 25/08 |
| | | | | 345/156 |
| 2004/0193441 | A1* | 9/2004 | Altieri | G06Q 30/02 |
| | | | | 709/203 |
| 2008/0030429 | A1* | 2/2008 | Hailpern | A63F 13/10 |
| | | | | 345/8 |
| 2008/0125218 | A1* | 5/2008 | Collins | G06Q 90/00 |
| | | | | 463/31 |
| 2008/0246693 | A1* | 10/2008 | Hailpern | A63F 13/10 |
| | | | | 345/8 |
| 2009/0076791 | A1* | 3/2009 | Rhoades | A63F 13/10 |
| | | | | 703/21 |
| 2009/0091583 | A1* | 4/2009 | McCoy | A63F 13/02 |
| | | | | 345/633 |
| 2014/0171039 | A1* | 6/2014 | Bjontegard | H04W 4/029 |
| | | | | 455/414.1 |
| 2016/0242010 | A1* | 8/2016 | Parulski | H04W 4/04 |

\* cited by examiner

LOCATION-BASED MOBILE STORYTELLING USING BEACONS

The present application is a Continuation of U.S. application Ser. No. 14/509,314, filed Oct. 8, 2014, which is hereby incorporated by reference in its entirety into the present application.

BACKGROUND

Storytelling can be a fun activity for people of all ages, especially children. It gives children both the opportunity to pick a book up and read a story, or use their own imagination to create their very own story. However, storytelling activities for children currently have limitations that may cause storytelling to become boring for the children. For example, after a child has read a book, that child might find it boring to re-read the same book as both the story and the animated characters in the book remain the same. For another example, when a child is creating his or her own book, the child may find the experience boring as he or she is probably limited to a pen and paper.

Nowadays, the digital world has also provided children with fun and entertaining activities, which children can play on using their very own mobile devices. For example, children are able to download software applications onto their mobile devices that allow them to play different board games, trivia games, sports games, or other activities that can be entertaining. This allows children to experience the activities that they use to play in the physical world on their very own mobile devices.

SUMMARY

The present disclosure is directed to location-based mobile storytelling using beacons, substantially as shown in and/or described in connection with at least one of the figures, as set forth more completely in the claims.

DETAILED DESCRIPTION

Figure 1:
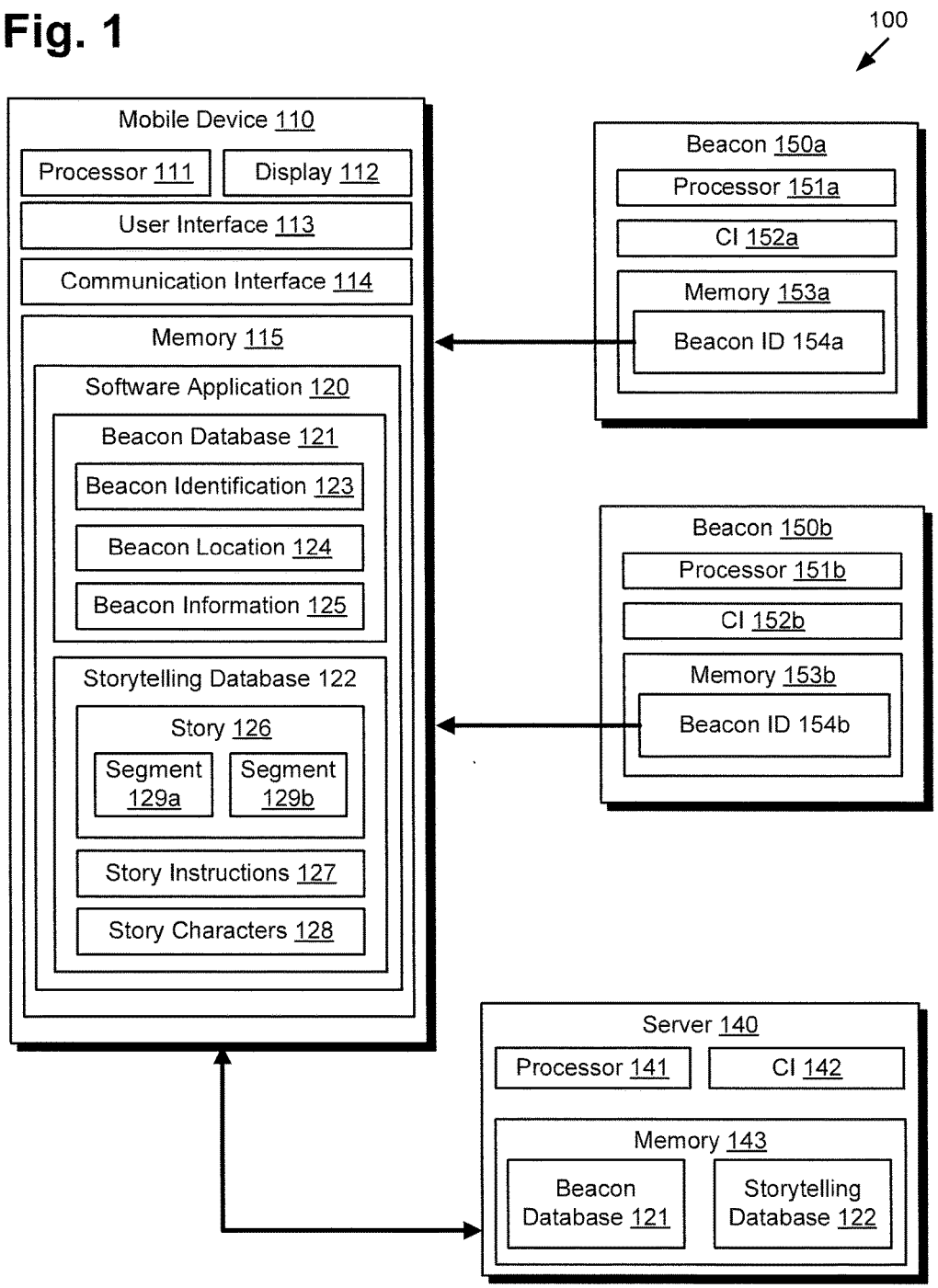
FIG. 1 presents a system that is used for location-based mobile storytelling using beacons, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system that is used for location-based mobile storytelling using beacons, according to one implementation of the present disclosure. System 100 of FIG. 1 includes mobile device 110, server 140, and beacon 150a and beacon 150b (collectively referred to as beacons 150). Mobile device 110 includes processor 111, display 112, user interface 113, communication interface 114, and memory 115. Memory 115 includes software application 120, which includes beacon database 121 and storytelling database 122. Beacon database 121 includes beacon identification 123, beacon location 124, and beacon information 125. Storytelling database 122 includes story 126, story instructions 127, and story characters 128. Story 126 includes segment 129a and segment 129b, collectively referred to as segments 129. Server 140 includes processor 141, communication interface 142, and memory 143. Memory 143 includes beacon database 121 and storytelling database 122. Beacon 150a includes processor 151a, communication interface 152b, and memory 153a. Memory 153a includes beacon identification (ID) 154a. Beacon 150b includes processor 151b, communication interface 152b, and memory 153b. Memory 153b includes beacon identification (ID) 154b.

System 100 is used to provide a user (not shown) in possession of mobile device 110 with a location-based storytelling experience. In one implementation, the location-based storytelling experience may include displaying story 126 to the user in possession of mobile device 110, where story 126 is pre-generated and loaded within software application 120. In such an implementation, story 126 may be separated into different segments 129, where each of segments 129 is associated with one of beacons 150. For example, story 126 may include, but is not limited to, written literature that is broken up into chapters or audiovisual content that is broken up into different scenes. In such an example, segments 129 of story 126 may each include one or more of the chapters and scenes. Furthermore, each of segments 129 may be associated with one of beacons 150, which is explained in greater detail below.

In another implementation, the user in possession of mobile device 110 may use software application 120 to create story 126 for the location-based storytelling experience. In such an implementation, the user associates beacons 150 with segments 129 of story 126. For example, the user may break his or her created story 126 into segments 129, which correspond to one or more chapters or scenes. In such an example, the user would associated each of segments 129 with one or more of beacons 150, as will also be explained in greater detail below.

As illustrated in FIG. 1, system 100 includes four separate devices in communication with one another, mobile device 110, server 140, and two beacons 150. Each of the devices of system 100 may include a personal computer, a mobile phone, a tablet, a Bluetooth beacon, or any other device capable of communicating with other devices using any wired or wireless technology. For example, in one implementation, mobile device 110 includes a mobile phone or tablet computer, while each of beacons 150 includes a Bluetooth beacons, or beacon using any other wireless technology. In such an implementation, beacons 150 may transmit data to mobile device 110 using a wireless technology.

It should be noted that the implementation of FIG. 1 only illustrates one mobile device 110, one server 140, and two beacons 150, however, the present disclosure is not limited to the implementation of FIG. 1. In other implementations, there may be any number of mobile devices, servers, and beacons in communication with one another. For example, in other implementations, mobile device 110 may be in communication with one beacon, or mobile device 110 may be in communication with more than two beacons.

Also illustrated in FIG. 1, mobile device 110 includes user interface 113 and display 112. User interface 113 may comprise, for example, a keyboard, a mouse, a game controller, a touch-screen input, a thermal and/or electrical sensor, or any other device capable of accepting user input for use with mobile device 110. Display 112 may comprise a liquid crystal display ("LCD"), a light-emitting diode ("LED"), an organic light-emitting diode ("OLED"), or another suitable display screen built into mobile device 110 that performs a physical transformation of signals to light. In some implementations, display 112 may also be touch sensitive and may serve as user interface 113.

Also illustrated in FIG. 1, mobile device 110 includes processor 111 and memory 115. Processor 111 may be configured to access memory 115 to store received input or to execute commands, processes, or programs stored in memory 115, such as software application 120. Processor 111 may correspond to a processing device, such as a microprocessor or similar hardware processing device, or a plurality of hardware devices. Memory 115 is a sufficient memory capable of storing commands, processes, and programs for execution by processor 111.

It should be noted that processor 141 and memory 143 of server 140, processor 151a and memory 153a of beacon 150a, and processor 151b and memory 153b of beacon 150b may be similar to processor 111 and memory 115 of mobile device 110. For example, processor 141 of server 140 may be configured to access memory 143 to store received input or to execute commands, processes, or programs stored in memory 143. For a second example, processor 151a of beacon 150a may be configured to access memory 153a to store received input or to execute commands, processes, or programs stored in memory 153a. Finally, for a third example, processor 151b of beacon 150b may be configured to access memory 153b to store received input or to execute commands, processes, or programs stored in memory 153b.

Also illustrated in FIG. 1, mobile device 110 further includes communication interface 114. In the implementation of FIG. 1, communication interface 114 includes any device that is capable both transmitting data with a transmitter and receiving data with a receiver. Processor 111 of mobile device 110 is thus configured to control communication interface 114 to communicate with other electronic devices, such as server 140 and beacons 150. As such, communication interface 114 can utilize, for example, one or more of Wireless Fidelity (Wi-Fi), Worldwide Interoperability for Microwave Access (WiMax), ZigBee, Bluetooth, Bluetooth low energy, Algorithm Division Multiple Access (CDMA), Evolution-Data Optimized (EV-DO), Global System for Mobile Communications (GSM), Long Term Evolution (LTE), and other types of wired and wireless technology.

It should be noted that communication interface 142 of server 140, communication interface 152a of beacon 150a, and communication interface 152b of beacon 150b similar to communication interface 114 of mobile device 110. For example, in one implementation, as discussed above, beacons 150 may be transmitting data to mobile device 110 using Bluetooth wireless technology. In such an implementation, each of beacons 150 may be communicating with mobile device 110 using Bluetooth specifications.

As shown in FIG. 1, mobile device 110 includes software application 120. In the implementation of FIG. 1, mobile device 110 utilizes software application 120 to give users of mobile device 110 location-based storytelling experiences. As such, software application 120 may include source code automatically running on mobile device 110, or launched by a user of mobile device 110, that is used to provide users with the location-based storytelling experiences. Furthermore, software application 120 may have come preloaded on mobile device 110, or software application 120 may be downloaded and installed by a user of mobile device 110.

Software application 120 provides users with location-based storytelling experiences using beacons 150. As illustrated in FIG. 1, beacon 150a transmits beacon ID 154a to mobile device 110, and beacon 150b transmits beacon ID 154b to mobile device 110. Each of beacon ID 154a and beacon ID 154b may include a data packet that includes the identity of beacon 150a and beacon 150b, respectively. For example, each of beacon ID 154a and beacon ID 154 may include a data packet that includes the universal unique identifier (UUID) of beacon 150a and beacon 150b. Beacon 150a may transmit beacon ID 154a to mobile device 110 when mobile device 110 gets within range of beacon 150a, and beacon 150b may transmit beacon ID 154b to mobile device 110 when mobile device 110 gets within range of beacon 150b.

For example, and as discussed above where beacons 150 include Bluetooth beacons, beacon 150a may be transmitting advertisements at given intervals that include beacon ID 154a. In such an example, mobile device 110 may receive one of the advertisements including beacon ID 154a when a user in possession of mobile device 110 gets within range of beacon 150a. For another example, and still using the example above where beacons 150 include Bluetooth beacons, mobile device 110 may be transmitting advertisements at given intervals. In such an example, beacon 150a may receive one of the advertisements (not shown) from mobile device 110 when mobile device 110 gets within range of beacon 150a. Beacon 150a may then transmit beacon ID 154a within another advertisement back to mobile device 110 in response to the receiving of the advertisement from mobile device 110.

As illustrated in FIG. 1, software application 120 includes beacon database 121. Beacon database 121 may include a database of stored information about each of the beacons that are utilized for the location-based storytelling experiences, such as beacons 150. As illustrated in the implementation of FIG. 1, beacon database 121 includes beacon identification 123, beacon location 124, and beacon information 125.

Beacon identification 123 may include data corresponding to the identifications of all of the beacons that may be utilized when generating location-based storytelling experiences. For example, mobile device 110 may use beacon identification 123 to determine which beacon transmitted a message (e.g. beacon identification) when mobile device 110 receives the message from a beacon. Beacon location 124 may include data corresponding to the locations of all of the beacons that may be utilized when generating location-based storytelling experiences. For example, mobile device 110 may use beacon location 124 to determine either the geographic location (or area) of the beacon, or how close mobile device 110 is to the beacon that transmitted the received message. Finally, beacon information 125 may include data corresponding to information about all of the beacons that may be utilized when generating location-based storytelling experiences. For example, beacon information 125 may include, but is not limited to, which segment of the location-based story the beacon is associated with, an identity for an object the beacon may be located in, and if the location-based story utilizes more than one beacon in a defined order, where in the defined order the beacon belongs to.

For example, a user in possession of mobile device 110 may be using mobile device 110 to generate a location-based story 126 that includes two segments 129, a first segment 129a and a second segment 129b. In such example, beacon 150a may be located in the user's kitchen and be associated with segment 129a of the story 126. Furthermore, beacon 150b may be located in the user's bedroom and be associated with segment 129b of story 126.

To generate the location-based storytelling experience for the example above, the user may first walk into the kitchen and receive beacon ID 154a transmitted from beacon 150a. After receiving beacon ID 154a from beacon 150a, mobile device 110 may execute software application 120 to determine beacon 150a transmitted beacon ID 154a using beacon identification 123, determine beacon 150a is located in the kitchen using beacon location 124, and determine that beacon 150a is associated with segment 129a of story 126 using beacon information 125. Mobile device 110 may then execute software application 120 to both generate and display segment 129a of story 126, which is explained in greater detail below.

Continuing with the example above, and after experiencing segment 129a of story 126, the user may decide to finish story 126 by viewing segment 129b of story 126. To finish story 126, the user may then walk into the bedroom and receive beacon ID 154b transmitted from beacon 150b. After receiving beacon ID 154b from beacon 150b, mobile device 110 may execute software application 120 to determine beacon 150b transmitted beacon ID 154b using beacon identification 123, determine beacon 150b is located in the bedroom using beacon location 124, and determine that beacon 150b is associated with segment 129b of story 126 using beacon information 125. Mobile device 110 may then execute software application 120 to both generate and display segment 129b of story 126, which is explained in greater detail below.

With reference to FIG. 1, software application 120 further includes storytelling database 122. Storytelling database 122 may be used by software application 120 to generate the location-based storytelling experience. For example, storytelling database 122 may generate segments 129 of the location-based story 126 each time mobile device 110 receives one or more beacon identifications transmitted from one or more beacons, or storytelling database 122 may generate the entire location-based story 126 after receiving all of the beacon identifications for all of the beacons.

As illustrated in FIG. 1, storytelling database 122 includes story 126, story instructions 127, and story characters 128. Story 126 may include data corresponding to a location-based story that is generated and displayed to a user that is in possession of mobile device 110. As illustrated in FIG. 1, story 126 includes two separate segments 129, segment 129a and segment 129b. In the implementation of FIG. 1, segment 129a may be associated with beacon 150a and segment 129b may be associated with beacon 150b. As such, software application 120 will utilize storytelling database 122 to generate segment 129a of story 126 when mobile device 110 receives beacon ID 154a from beacon 150a, and generate segment 129b of story 126 when mobile device 110 receives beacon ID 154b from beacon 150b.

It should be noted that the implementation of FIG. 1 only illustrates story 126 as including two segments 129, however, the present disclosure is not limited to the implementation of FIG. 1. For example, in other implementations, story 126 may include any number of segments 129. In such an example, each of segments 129 may be associated with a single beacon, or two or more of segments 129 may be associated with a single beacon.

In one implementation, a user may use software application 120 to create his or her own location-based story 126. In such an implementation, the user may break story 126 into segments 129 and associate each of segments 129 with one of beacons 150. For example, the user may use software application 120 to create a story 126 about a city, where story 126 includes scenes corresponding to different geographic locations within a city. In such an example, the user may associate segment 129a of story 126 with the post office of the city, and the user may associate segment 129b of story 126 with the restaurant of the city. As such, if the user first walks within range of beacon 150a, software application 120 will cause mobile device 110 to display segment 129a of story 126, which may include displaying a post office environment. Next, if the user then walks within range of beacon 150b, software application 120 will cause mobile device 110 to display segment 129b of story 126, which may include displaying a restaurant environment.

Story instructions 127 may include data corresponding to instructions that are provided to a user of mobile device 110 when generating the location-based story. For example, and using the example above, story 126 may include a first segment 129a which is associated with beacon 150a located in the user's kitchen and a second segment 129b which is associated with beacon 150b located in the user's bedroom. In such an example, story instructions 127 may be used to tell the user in possession of mobile device 110 to go to the kitchen first to find beacon 150a and then go to the bedroom second to find beacon 150b. As such, the user will be provided with segment 129a of story 126 first after going in the kitchen and then the user will be provided with segment 129b of story 126 second after going in the bedroom.

Story characters 128 may include data corresponding to different characters that can be used with location-based stories. For example, story characters 128 may include, but are not limited to, people, animated characters, and avatars. Software application 120 may thus use story characters 128 when generating story 126 to give the user a more personal and fun experience. For example, and as will be discussed in further details below, one or more of beacons 150 is located within an object, such as a stuffed animal. In such an example, story characters 128 may include an animated character that looks like the stuffed animal and software application 120 may use the animated character in story 126.

Also illustrated in FIG. 1, system 100 includes server 140. In implementations that include server 140, mobile device 110 may utilize server 140 to either generate the location-based storytelling experience, or mobile device 110 may utilize server 140 to update software application 120. For example, in one implementation, mobile device 110 may not include software application 120. In such an implementation, mobile device 110 may communicate with server 140 to generate the location-based storytelling experience for the user in possession of mobile device 110 in a similar method as described above using beacon database 121 and storytelling database 122 stored on server 140. For another example, in another implementation, server 140 may be used to update software application 120 on mobile device 110. In such an implementation, server 140 may update mobile device 110 at given time intervals or each time a new location-based story is created for beacons 150.

In one implementation, one or more beacons 150 may be located within an object. In such an implementation, the object may also be used by software application 120 when generating the location-based storytelling experience. For example, beacon information 125 may include an identity for the object the beacon is located in. In such an example, software application 120 may use the identity of the object when generating the segment of the location-based story that is associated with the beacon.

For example, and using the example above, beacon 150*a* may be located in the kitchen of the user's house and be associated with a post office, while beacon 150*b* is located in the bedroom of the user's house and associated with a restaurant. Furthermore, beacon 150*b* may be included within a stuffed animal, such as a stuffed animal of a dog. In such an example, when the user in possession of mobile device 110 enters the kitchen and gets within range of beacon 150*a*, software application 120 may cause display 112 to show segment 129*a* of story 126, which may include a post office environment. Furthermore, when the user enters the bedroom and gets within range of beacon 150*b*, software application 120 may cause display 112 to show segment 129*b* of story 126, which may include a restaurant environment. However, since beacon 150*b* is located within a stuffed animal of a dog, software application 120 may further cause display 112 to show an animated dog within the restaurant environment, where the animated dog looks similar to the stuffed animal of the dog.

Figure 2:
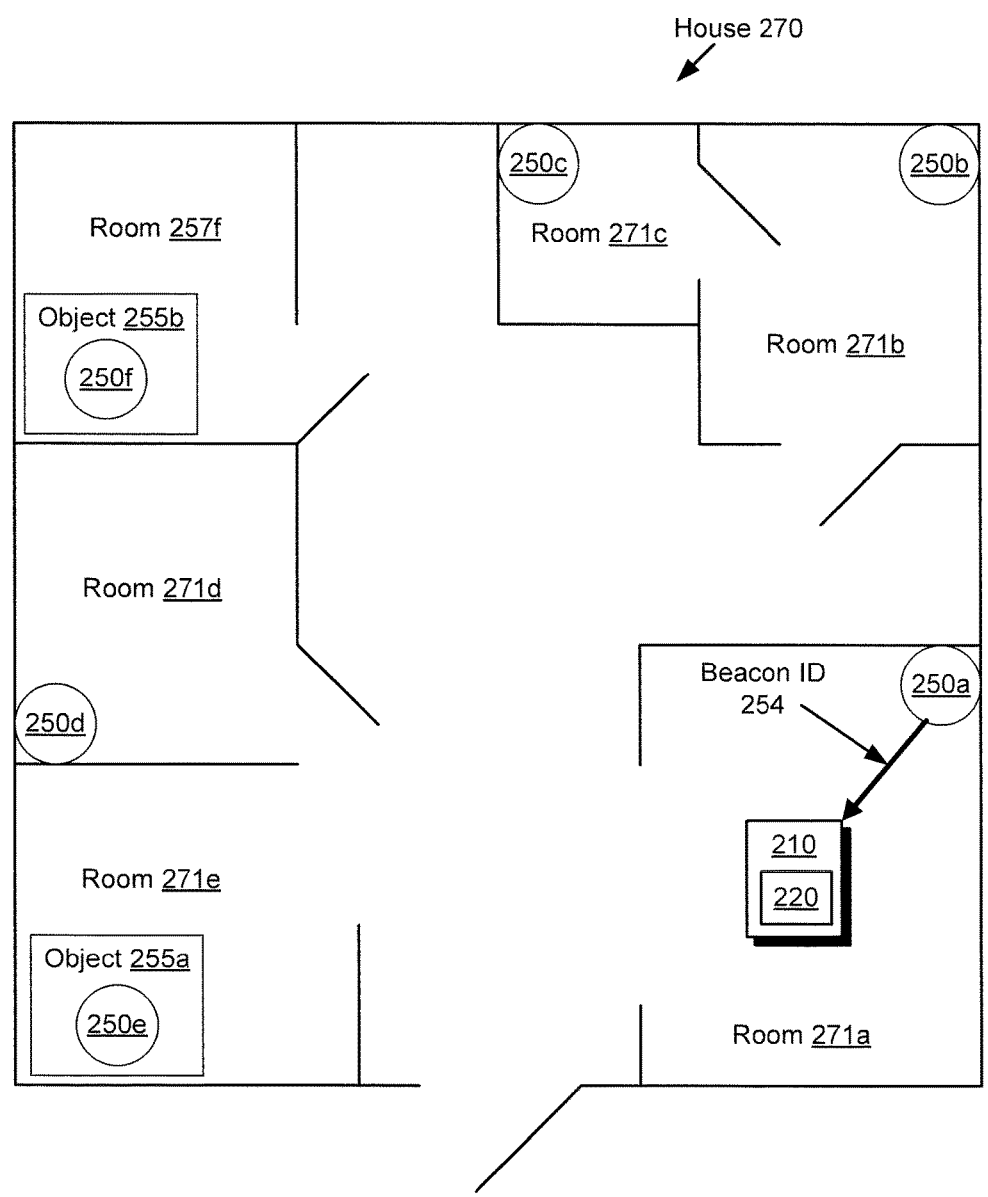
FIG. 2 presents an example of using location-based mobile storytelling using beacons, according to one implementation of the present disclosure.

FIG. 2 presents an example of using location-based mobile storytelling using beacons, according to one implementation of the present disclosure. FIG. 2 includes house 270, which includes room 271*a*, room 271*b*, room 271*c*, room 271*d*, room 271*e*, and room 271*f*, collectively referred to as rooms 271. Also illustrated in FIG. 2 is beacon 250*a*, beacon 250*b*, beacon 250*c*, beacon 250*d*, beacon 250*e*, and beacon 250*f*, collectively referred to as beacons 250, beacon ID 254, and object 255*a* and object 255*b*, collectively referred to as objects 255, located within house 270. Furthermore, mobile device 210 running software application 220 is also located within house 270.

With regard to FIG. 2, it should be noted that mobile device 210, software application 220, beacon 250*a*, beacon 250*b*, and beacon ID 254 correspond respectively to mobile device 110, software application 120, beacon 150*a*, beacon 150*b*, and beacon ID 254*a* from FIG. 1. Furthermore, many features have been left out of FIG. 2 for clarity purposes.

In the implementation of FIG. 2, a user in possession of mobile device 210 may be using software application 220 running on mobile device 210 to create a location-based storytelling experience. In order to create the location-based storytelling experience, each of beacons 250 may be associated with a different segment of a location-based story. For example, beacons 250 may have already been associated with different segments of a pre-generated location-based story when the user purchased beacons 250, or the user may have associated beacons 250 to different segments of his or her own location-based story.

For example, the location-based story may be based in a city and each of beacons 250 may be associated with a different building or geographic location within the city. In such an example, beacon 250*a* located in room 271*a* (the kitchen) may be associated with a post office, beacon 250*b* located in room 271*b* (the first bedroom) may be associated with a restaurant, beacon 250*c* located in room 271*c* (the bathroom) may be associated with a school, beacon 250*d* located in room 271*d* (the second bedroom) may be associated with a playground, beacon 250*e* located in room 271*e* (the living room) may be associated with a zoo, and beacon 250*f* located in room 271*f* (the office) may be associated with a beach. Furthermore, beacon 250*e* may be located within object 255*a*, which may include a stuffed animal of a lion, and beacon 250*f* may be located within object 255*b*, which may include a stuffed animal of a bird.

To create the location-based storytelling experience, the user in possession of mobile device 210 walks into different rooms 271 throughout house 270 to receive the different segments of the location-based story. As illustrated in FIG. 2, the user first walks into room 271*a*, which includes beacon 250*a*. In response to the user walking into room 271*a* and getting within range of beacon 250*a*, mobile device 210 receives beacon ID 254 from beacon 250*a*. As discussed above, beacon ID 254 may include the UUID of beacon 250*a*. After receiving beacon ID 254 from beacon 250*a*, software application 220 running on mobile device 210 uses beacon ID 254 to determine that beacon 250*a* transmitted beacon ID 254 and that beacon 250*a* is associated with the post office. Software application 220 then causes mobile device 210 to display the segment of the location-based story that corresponds to the post office. For example, software application 220 may cause mobile device 210 to display a post office environment to the user. In such an example, the post office environment may include different characters (such as a post office worker) and music that represent a post office theme.

After the user has enjoyed the first segment of the location-based story, the user may then decide to walk into one of the other rooms 271 of house 270 to enjoy other segments of the location-based story. As discussed above, in one implementation, the location-based story may include a specific sequence for beacons 250 based on the location-based story. In such an implementation, software application 220 may cause mobile device 210 to display detailed instructions to the user for which of beacons 250 to go to next, such as story instructions 127 from FIG. 1. However, in other implementations, the location-based story may not include a specific sequence for beacons 250. In such an implementation, the user is free to create his or her own location-based story that is based on the order the user chooses for visiting each of beacons 250.

For example, the user in possession of mobile device 210 may walk into room 271*b* next, which includes beacon 250*b*. In response to the user walking into room 271*b* and getting within range of beacon 250*b*, mobile device 210 may receive a beacon ID (not shown) from beacon 250*b*. After receiving the beacon ID from beacon 250*b*, software application 220 running on mobile device 210 may then use the beacon ID to determine that beacon 250*b* transmitted the beacon ID and that beacon 250*b* is associated with the restaurant. Software application 220 may then cause mobile device 210 to display the segment of the location-based story that corresponds to the restaurant. For example, software application 220 may cause mobile device 210 to display a restaurant environment to the user. In such an example, the restaurant environment may include different characters (such as waiters or a hostess) and music that represent a restaurant theme.

For another example, the user in possession of mobile device 210 may walk into room 271*e* next, which includes beacon 250*e*. In response to the user walking into room 271*e* and getting within range of beacon 250*e*, mobile device 210 may receive a beacon ID (not shown) from beacon 250*e*. After receiving the beacon ID from beacon 250*e*, software application 220 running on mobile device 210 may then use the beacon ID to determine that beacon 250*e* transmitted the beacon ID and that beacon 250*e* is associated with the zoo and included within object 255*a*. Software application 220 may then cause mobile device 210 to display the segment of the location-based story that corresponds to the zoo. For example, software application 220 may cause mobile device 210 to display a zoo environment to the user. In such an example, the zoo environment may include a character that corresponds to object 255a, such as an animated lion that looks like object 255a.

It should be noted that the implementation of FIG. 2 only illustrates beacons 250 being located within house 270, however, the present disclosure is not limited to the implementation of FIG. 2. In other implementations, beacons 250 may be located within other locations such as, but not limited to, theme parks, sporting events, or carnivals. For example, in one implementation, beacons 250 may be located within a theme park. In such an implementation, each of beacons 250 may be associated with a defined geographic area of the theme park. For example, beacon 250a may be located within a geographic area of the theme park that includes a pirate theme. In such an example, software application 220 may cause mobile device 210 to display a pirate environment with pirate themed characters and music in response to receiving beacon ID 254 from beacon 250a.

Figure 3:
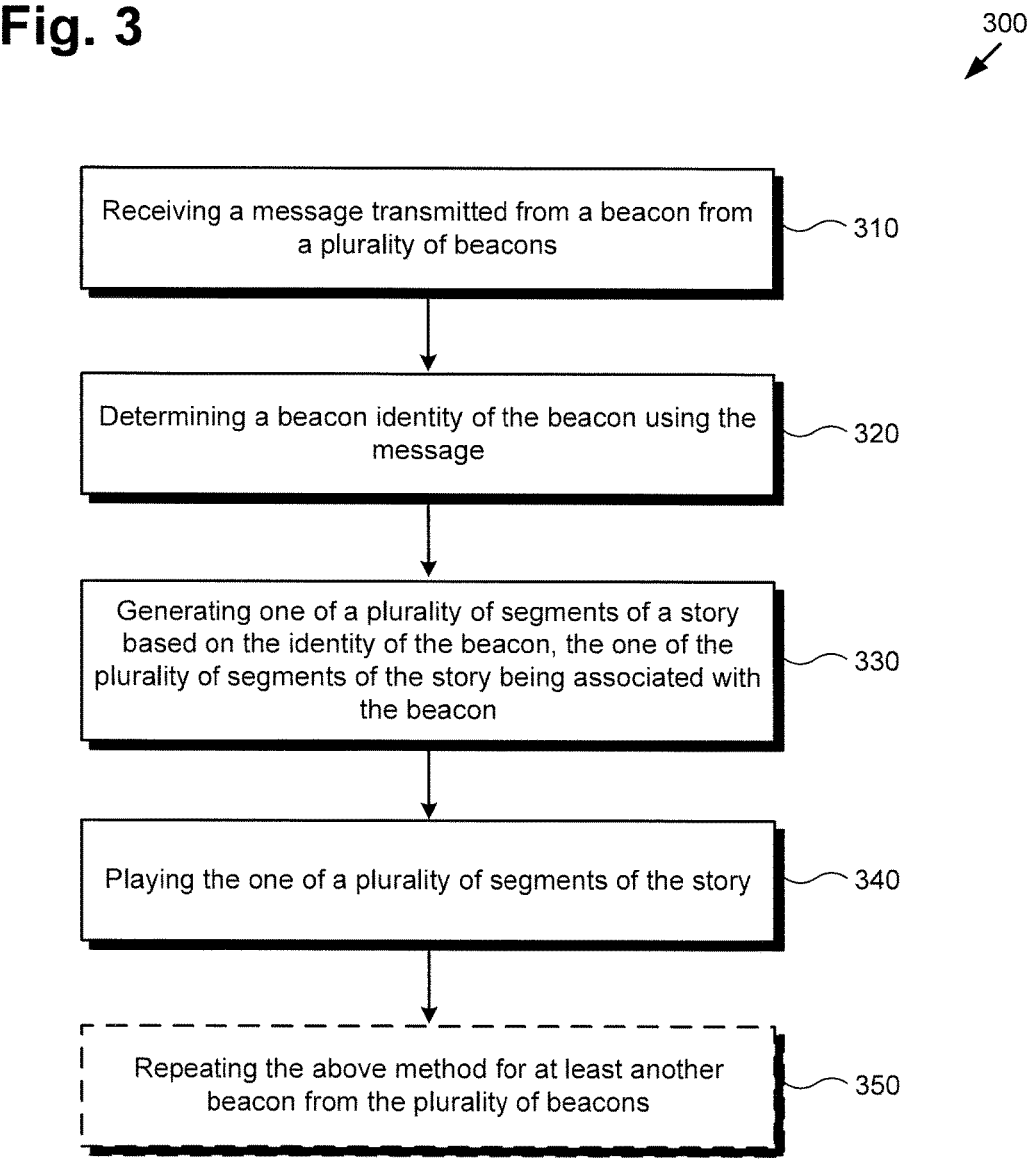
FIG. 3 shows a flowchart illustrating a method for location-based mobile storytelling using beacons, according to one implementation of the present disclosure.

FIG. 3 shows a flowchart illustrating a method for location-based mobile storytelling using beacons, according to one implementation of the present disclosure. The approach and technique indicated by flowchart 300 are sufficient to describe at least one implementation of the present disclosure, however, other implementations of the disclosure may utilize approaches and techniques different from those shown in flowchart 300. Furthermore, while flowchart 300 is described with respect to FIG. 1, the disclosed inventive concepts are not intended to be limited by specific features shown and described with respect to FIG. 1. Furthermore, with respect to the method illustrated in FIG. 3, it is noted that certain details and features have been left out of flowchart 300 in order not to obscure the discussion of inventive features in the present application.

Referring now to flowchart 300 of FIG. 3, flowchart 300 (at 310) includes receiving a message transmitted from a beacon from a plurality of beacons. For example, processor 111 of mobile device 110 may execute software application 120 to receive beacon ID 154a transmitted from beacon 150a from beacons 150. As discussed, in one implementation, beacon 150a may include a Bluetooth beacon. In such an implementation, mobile device 110 may receive an advertisement transmitted from beacon 150a that includes beacon ID 154a.

Flowchart 300 (at 320) continues with determining an identity of the beacon using the message. For example, processor 111 of mobile device 110 may execute software application 120 to determine the identity of beacon 150a using beacon ID 154a. As discussed above, software application 120 may use beacon database 121 to determine the identity of beacon 150a using beacon ID 154a.

Flowchart 300 (at 330) continues with generating one of a plurality of segments of a story based on the identity of the beacon, the one of the plurality of segments of the story being associated with the beacon. For example, processor 111 of mobile device 110 may execute software application 120 to generate segment 129a of story 126 based on the identity of beacon 150a, where segment 129a of story 126 is associated with beacon 150a. As discussed above, software application 120 may generate segment 129a of story 126 using storytelling database 122. Furthermore, software application 120 may have come pre-loaded with segment 129a of story 126 being associated with beacon 150a, or a user in possession of mobile device may have associated segment 129a of story 126 with beacon 150a.

Flowchart 300 (at 340) continues with playing the one of the plurality of parts of the story. For example, processor 111 of mobile device 110 may execute software application 120 to play segment 129a of story 126. As discussed above, displaying segment 129a of story 126 may include displaying a location-based environment that corresponds to segment 129a of story 126 on display 112. For example, and using the example above, story 126 may be based in a city and beacon 150a may be associated with the post office of the city. In such an example, software application 120 may cause display 112 to display a post office environment for segment 129a of story 126, where the post office environment may include different characters (such as a post office worker) and music that represent a post office theme.

Flowchart 300 (at 350) may optionally continue with repeating the above method for at least another beacon from the plurality of beacons. For example, processor 111 of mobile device 110 may execute software application 120 to repeat the above method for beacon 150b from beacons 150. As discussed above, software application 120 will generate and display segment 129b of story 126 after receiving beacon ID 154b from beacon 150b.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A server for use in a system including a mobile device, the server comprising:
   a memory storing a storytelling database and a beacon database, the storytelling database having a story that includes a plurality of segments, each segment of the plurality of segments of the story being associated with one of a plurality of beacons stored in the beacon database; and
   a processor configured to:
     receive, from the mobile device, a first message transmitted by a first beacon of the plurality of beacons to the mobile device when the mobile device being carried by a user is at a first location;
     determine a first beacon identity of the first beacon using the first message;
     obtain a first segment of the plurality of segments of the story based on the first beacon identity, the first segment of the story being associated with the first beacon;
     provide the first segment of the story for the user to the mobile device;
     receive, from the mobile device after providing the first segment of the plurality of segments of the story to the mobile device, a second message transmitted by a second beacon of the plurality of beacons to the mobile device when the mobile device being carried by the user is at a second location;
     determine a second beacon identity of the second beacon using the second message;

obtain a second segment of the plurality of segments of the story based on the second beacon identity, the second segment of the story being associated with the second beacon; and provide the second segment of the story for the user to the mobile device.

2. The server of claim 1, wherein the mobile device includes a display, and wherein the processor provides the first segment of the story by playing the first segment of the story on the display of the mobile device.

3. The server of claim 1, wherein before receiving the second message, the processor is further configured to:

provide instructions to the user of the mobile device to move from the first location to the second location for locating the second beacon.

4. The server of claim 1, wherein the first beacon is located in a defined geographic location, and wherein to obtain the first segment of the plurality of segments of the story the processor is configured to:

determine the defined geographic location using the first beacon identity of the first beacon; and obtain the first segment of the story based on the defined geographic location.

5. The server of claim 4, wherein the defined geographic location includes at least one of a room in a house and a geographic location within a park.

6. The server of claim 1, wherein the first beacon is part of an object, and wherein to obtain the first segment of the plurality of segments of the story the processor is configured to:

determine an object identity of the object using the first beacon identity of the first beacon; and obtain the first segment of the story based on the object identity, wherein the first segment of the story includes an animated character that corresponds to the object.

7. The server of claim 1, wherein before receiving the first message, the processor is further configured to:

receive a plurality of beacon identities including the first beacon identity; and associate each of the plurality of beacon identities including the first beacon identity with one of the plurality of beacons including the first beacon.

8. The server of claim 1, wherein each of the plurality of beacons includes a Bluetooth device, and wherein the first message is received by the mobile device from the first beacon using the Bluetooth device.

9. The server of claim 1, wherein the processor is further configured to:

associate each segment of the plurality of segments with one of the plurality beacons according to the user's selection prior to receiving the first message.

10. A method for use by server for use in a system including a mobile device, the server having a memory storing a storytelling database and a beacon database, the storytelling database having a story that includes a plurality of segments, each segment of the plurality of segments of the story being associated with one of a plurality of beacons stored in the beacon database, the method comprising:

receiving, from the mobile device, a first message transmitted by a first beacon of the plurality of beacons to the mobile device when the mobile device being carried by a user is at a first location;

determining a first beacon identity of the first beacon using the first message;

obtaining a first segment of the plurality of segments of the story based on the first beacon identity, the first segment of the story being associated with the first beacon;

providing the first segment of the story for the user to the mobile device;

receiving, from the mobile device after providing the first segment of the plurality of segments of the story to the mobile device, a second message transmitted by a second beacon of the plurality of beacons to the mobile device when the mobile device being carried by the user is at a second location;

determining a second beacon identity of the second beacon using the second message;

obtaining a second segment of the plurality of segments of the story based on the second beacon identity, the second segment of the story being associated with the second beacon; and providing the second segment of the story for the user to the mobile device.

11. The method of claim 10, wherein the mobile device includes a display, and wherein providing the first segment of the story plays the first segment of the story on the display of the mobile device.

12. The method of claim 10, wherein before receiving the second message, the method further comprises:

providing instructions to the user of the mobile device to move from the first location to the second location for locating the second beacon.

13. The method of claim 10, wherein the first beacon is located in a defined geographic location, and wherein for obtaining the first segment of the plurality of segments of the story the method further comprises:

determining the defined geographic location using the first beacon identity of the first beacon; and obtaining the first segment of the story based on the defined geographic location.

14. The method of claim 13, wherein the defined geographic location includes at least one of a room in a house and a geographic location within a park.

15. The method of claim 10, wherein the first beacon is part of an object, and wherein for obtaining the first segment of the plurality of segments of the story the method further comprises:

determining n object identity of the object using the first beacon identity of the first beacon; and obtaining the first segment of the story based on the object identity, wherein the first segment of the story includes an animated character that corresponds to the object.

16. The method of claim 10, wherein before receiving the first message, the method further comprises:

receiving a plurality of beacon identities including the first beacon identity; and associating each of the plurality of beacon identities including the first beacon identity with one of the plurality of beacons including the first beacon.

17. The method of claim 10, wherein each of the plurality of beacons includes a Bluetooth device, and wherein the first message is received by the mobile device from the first beacon using the Bluetooth device.

18. The method of claim 10 further comprises:

associating each segment of the plurality of segments with one of the plurality beacons according to the user's selection prior to receiving the first message.

19. A device comprising:

a memory storing a storytelling database and a beacon database, the storytelling database having a story that includes a plurality of segments, each segment of the plurality of segments of the story being associated with one of a plurality of beacons stored in the beacon database; and a processor configured to:
   receive a first message transmitted from a first beacon of the plurality of beacons;
   determine a first object identity associated with the first beacon using the first message;
   obtain a first segment of the plurality of segments of the story including a first animation of a first object corresponding to the first object identity;
   play the first segment of the story including the first animation of the first object;
   receive, after playing the first segment of the plurality of segments of the story, a second message transmitted from a second beacon of the plurality of beacons;
   determine a second object identity associated with the second beacon using the second message;
   obtain a second segment of the plurality of segments of the story including a second animation of a second object corresponding to the second object identity;
   play the second segment of the story including the second animation of the second object.

20. The device of claim 19, wherein the device is one of a mobile device and a server, and wherein the first beacon is part of the first object and the second beacon is part of the second object.

* * * * *